United States Patent
Pan et al.

(10) Patent No.: US 10,534,247 B2
(45) Date of Patent: Jan. 14, 2020

(54) PROJECTOR, IMAGE GENERATION DEVICE, AND IMAGE GENERATION METHOD THEREOF

(71) Applicant: Coretronic Corporation, Hsin-Chu (TW)

(72) Inventors: Haw-Woei Pan, Hsin-Chu (TW); Chi-Tang Hsieh, Hsin-Chu (TW); Hsin-Yueh Chang, Hsin-Chu (TW)

(73) Assignee: Coretronic Corportion, Hsin-Chu (TW)

( * ) Notice: Subject to any disclaimer, the term of this patent is extended or adjusted under 35 U.S.C. 154(b) by 0 days.

(21) Appl. No.: 16/246,559

(22) Filed: Jan. 14, 2019

(65) Prior Publication Data
US 2019/0227417 A1     Jul. 25, 2019

(30) Foreign Application Priority Data

Jan. 19, 2018   (CN) .......................... 2018 1 0053332

(51) Int. Cl.
*G03B 21/20* (2006.01)
*H04N 9/31* (2006.01)
*G03B 21/00* (2006.01)

(52) U.S. Cl.
CPC ......... *G03B 21/204* (2013.01); *G03B 21/008* (2013.01); *G03B 21/208* (2013.01);
(Continued)

(58) Field of Classification Search
CPC .. G03B 21/005; G03B 21/006; G03B 21/008; G03B 21/28; G03B 21/204;
(Continued)

(56) References Cited

U.S. PATENT DOCUMENTS

2014/0347634 A1   11/2014   Bommerbach et al.
2015/0098070 A1    4/2015   Hsieh et al.
(Continued)

FOREIGN PATENT DOCUMENTS

CN       2525547       12/2002
CN     104238248       12/2014
(Continued)

OTHER PUBLICATIONS

"Search Report of Europe Counterpart Application", dated Mar. 11, 2019, p. 1-p. 8.

*Primary Examiner* — Sultan Chowdhury
(74) *Attorney, Agent, or Firm* — JCIPRNET

(57) ABSTRACT

The disclosure provides a projector, an image generation device, and an image generation method thereof. The projector includes an image generator, a light combiner, and a projection lens. The image generator includes light valves and generates an image beam. The light combiner includes a diffusing and filtering component, which generates a combined beam, and the image generator receives the combined beam from the diffusing and filtering component. In a first time period, the light combiner converts a first input beam into partial beams. The partial beams are transmitted to the light valves respectively. In a second time period, the light combiner receives a second input beam. The diffusing and filtering component filters out one of the partial beams, and the other of the partial beams are transmitted with the second input beam respectively to the light valves.

23 Claims, 5 Drawing Sheets

(52) U.S. Cl.
CPC ..... *G03B 21/2013* (2013.01); *G03B 21/2093* (2013.01); *H04N 9/3161* (2013.01); *H04N 9/3164* (2013.01); *H04N 9/3197* (2013.01)

(58) Field of Classification Search
CPC ............ G03B 21/2013; G03B 21/2033; G03B 21/2053; G03B 21/2066; H04N 9/3102; H04N 9/3111; H04N 9/3114; H04N 9/3123; H04N 9/3161; H04N 9/3164; H04N 9/3197
See application file for complete search history.

(56) References Cited

U.S. PATENT DOCUMENTS

| | | | |
|---|---|---|---|
| 2016/0147135 A1 | 5/2016 | Cheng | |
| 2017/0293212 A1 | 10/2017 | Wang et al. | |
| 2017/0347075 A1* | 11/2017 | Okuda | G03B 21/204 |
| 2018/0196335 A1* | 7/2018 | Kato | G03B 21/00 |

FOREIGN PATENT DOCUMENTS

| | | |
|---|---|---|
| CN | 104267567 | 1/2015 |
| CN | 104345534 | 2/2015 |
| CN | 104980721 | 10/2015 |
| CN | 105022212 | 11/2015 |
| CN | 104216210 | 1/2017 |
| CN | 106412535 | 2/2017 |
| JP | 2015031876 | 2/2015 |
| TW | M331685 | 5/2008 |
| TW | 201514603 | 4/2015 |
| TW | 201542966 | 11/2015 |
| TW | M547687 | 8/2017 |

\* cited by examiner

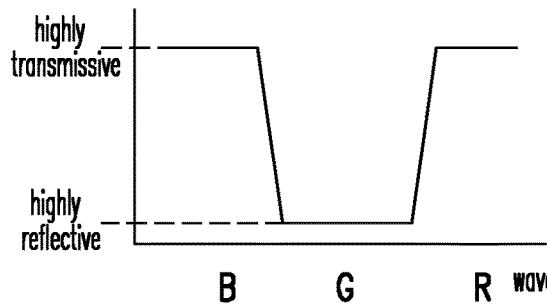
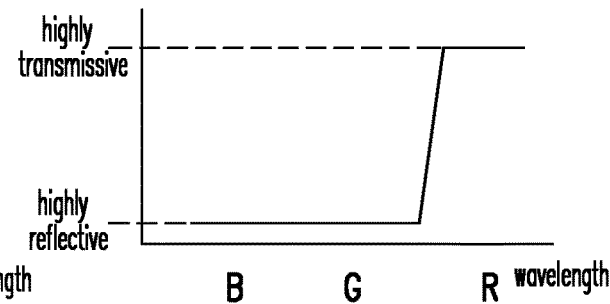
FIG. 7A            FIG. 7B
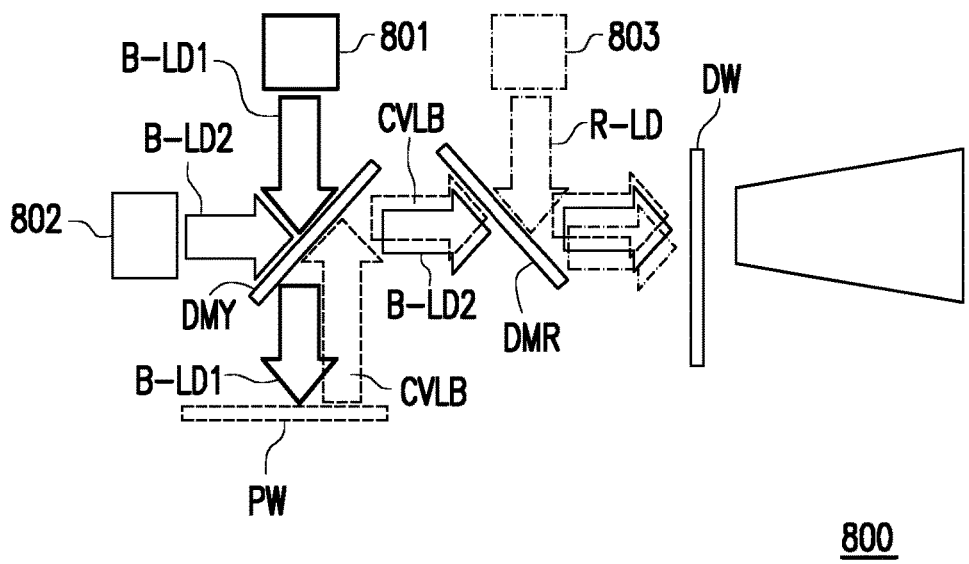
FIG. 8

PROJECTOR, IMAGE GENERATION DEVICE, AND IMAGE GENERATION METHOD THEREOF

CROSS-REFERENCE TO RELATED APPLICATION

This application claims the priority benefit of China application serial no. 201810053332.4, filed on Jan. 19, 2018. The entirety of the above-mentioned patent application is hereby incorporated by reference herein and made a part of this specification.

BACKGROUND

Technical Field

The disclosure relates to a projector, an image generation device, and an image generation method thereof, and more particularly relates to a projector having a plurality of light valves, an image generation device, and an image generation method thereof.

Description of Related Art

In order to improve the image display performance of a projector, the conventional technology has proposed to dispose two digital micromirror devices (DMDs) in the image generation device of the projector. In the conventional projector, however, after a blue incident beam is transmitted to a phosphor wheel, the beam is guided to one of the digital micromirror devices, while at this moment, the other digital micromirror device does not receive any beam and is in an idle state.

In other words, the digital micromirror devices disposed in the conventional projector are not used efficiently, which results in a waste of resources.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projector, an image generation device, and an image generation method thereof where the efficiency of utilization of a plurality of light valves is improved.

Other purpose and advantages of the disclosure may be understood from the technical features of the disclosure.

To achieve one, part, or all of the foregoing purposes or other purposes, an embodiment of the invention provides a projector. The projector includes an image generator, a light combiner, and a projection lens. The image generator includes a first light valve and a second light valve and is configured to generate an image beam. The projection lens is located on a transmission path of the image beam from the image generator. The light combiner includes a diffusing and filtering component, which is configured to generate a combined beam, and the image generator is configured to receive the combined beam from the diffusing and filtering component. In a first time period, the light combiner is configured to receive a first input beam and convert the first input beam into a conversion beam, wherein the conversion beam includes a first partial beam and a second partial beam that have different wavelengths, and the first partial beam and the second partial beam are respectively transmitted to the first light valve and the second light valve. In a second time period, the light combiner is configured to receive the first input beam to convert the first input beam into the conversion beam, the light combiner is configured to receive a second input beam and transmit the second input beam, the diffusing and filtering component is configured to filter out one of the first partial beam and the second partial beam, the other of the first partial beam and the second partial beam is transmitted to one of the first light valve and the second light valve, and the second input beam is transmitted to the other of the first light valve and the second light valve.

To achieve one, part, or all of the foregoing purposes or other purposes, an embodiment of the invention provides an image generation device. The image device includes an image generator and a light combiner. The image generator includes a first light valve and a second light valve. The light combiner includes a diffusing and filtering component. In a first time period, the light combiner is configured to receive a first input beam and convert the first input beam into a conversion beam, wherein the conversion beam includes a first partial beam and a second partial beam that have different wavelengths, and the first partial beam and the second partial beam are respectively transmitted to the first light valve and the second light valve. In a second time period, the light combiner is configured to receive the first input beam to convert the first input beam into the conversion beam, the light combiner is configured to receive a second input beam and transmit the second input beam, the diffusing and filtering component is configured to filter out one of the first partial beam and the second partial beam, the other of the first partial beam and the second partial beam is transmitted to one of the first light valve and the second light valve, and the second input beam is transmitted to the other of the first light valve and the second light valve.

To achieve one, part, or all of the foregoing purposes or other purposes, an embodiment of the invention provides an image generation method The image generation method includes: in a first time period, providing a light combiner to receive a first input beam and convert the first input beam into a conversion beam, wherein the conversion beam includes a first partial beam and a second partial beam that have different wavelengths; in the first time period, providing an image generator to respectively transmit the first partial beam and the second partial beam to a first light valve and a second light valve; in a second time period, providing the light combiner to receive the first input beam to convert the first input beam into the conversion beam, and providing the light combiner to receive a second input beam and transmit the second input beam; and in the second time period, providing a diffusing and filtering component to filter out one of the first partial beam and the second partial beam, wherein the other of the first partial beam and the second partial beam is transmitted to one of the first light valve and the second light valve, and the second input beam is transmitted to the other of the first light valve and the second light valve.

In light of the above, the embodiments of the invention at least exhibit one of the advantages or effects below. The light combiner is used to provide beams of different components to the image generator during different time periods, and the image generator receives the beams of different components, such that the first light valve and the second light valve both receive beams during different time periods for performing the image conversion operation. Thus, the efficiency of utilization of the first light valve and the second light valve is improved significantly.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 7A and FIG. 7B are diagrams respectively showing optical characteristic curves of a light splitting component 630 in the first operation mode and the second operation mode according to the embodiment of FIG. 6.

FIG. 8 is a schematic diagram of a light combiner according to another embodiment of the disclosure.

DETAILED DESCRIPTION OF DISCLOSED EMBODIMENTS

In the following detailed description of the preferred embodiments, reference is made to the accompanying drawings which form a part hereof, and which are shown by way of illustrating specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces," and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
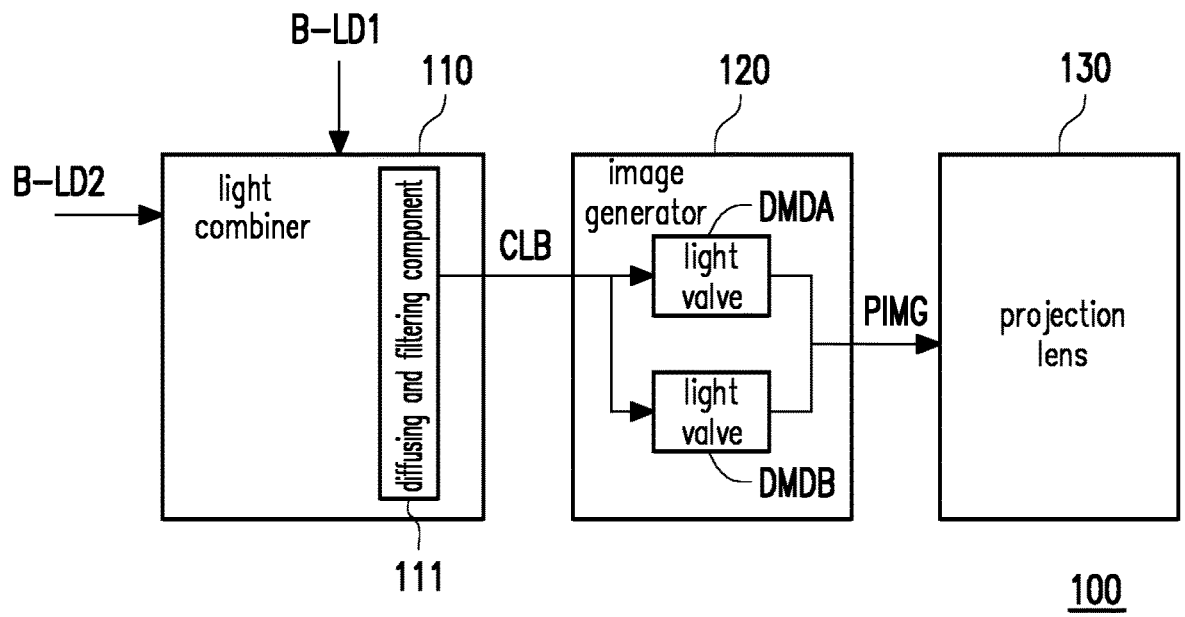
FIG. 1 is a schematic diagram of the projector according to an embodiment of the disclosure.

Referring to FIG. 1, FIG. 1 is a schematic diagram of a projector according to an embodiment of the disclosure. The projector 100 includes a light combiner 110, an image generator 120, and a projection lens 130. The light combiner 110 includes a diffusing and filtering component 111, and the image generator 120 includes a (first) light valve DMDA and a (second) light valve DMDB and is configured to generate an image beam PIMG. The projection lens 130 is located on a transmission path of the image beam PIMG from the image generator 120. In this embodiment, the light combiner 110 is configured to receive at least one of a (first) input beam B-LD1 and a (second) input beam B-LD2 and generate a combined beam CLB by the diffusing and filtering component 111. In this embodiment, the combined beam CLB has a plurality of different parts. The image generator 120 is configured to receive the combined beam CLB from the diffusing and filtering component 111 and may simultaneously receive two of the parts of the combined beam CLB by the light valves DMDA and DMDB respectively.

Specifically, in this embodiment, the light combiner 110 may receive the input beam B-LD1 in a first time period and convert the input beam B-LD1 into a conversion beam (described in detail later). In this embodiment, the conversion beam includes a first partial beam and a second partial beam that have different wavelengths. For example, the input beam B-LD1 may be a blue laser beam having a wavelength of about 445 nm, but the disclosure is not limited thereto. In other embodiments, the wavelength of the input beam B-LD1 may have other appropriate values according to requirements of design or product. In other embodiments, the input beam B-LD1 may be other excitation beams, such as a beam provided by a light-emitting diode, but the disclosure is not limited thereto. By a conversion operation, the light combiner 110 may convert the input beam B-LD1 into the first partial beam and the second partial beam that may have a green light wavelength and a red light wavelength respectively. In other words, the light combiner 110 may convert the input beam B-LD1 into a yellow conversion beam. In this embodiment, the input beam B-LD2 is not provided in the first time period.

Further to the above, also in the first time period, the image generator 120 receives the first partial beam and the second partial beam, which are a green light beam and a red light beam respectively, and may transmit the first partial beam and the second partial beam to the light valve DMDA and the light valve DMDB respectively for the light valve DMDA and the light valve DMDB to generate the image beam PIMG.

Furthermore, in a second time period, the light combiner 110 may receive the input beam B-LD1 and the input beam B-LD2 simultaneously. The light combiner 110 may convert the input beam B-LD1 to generate the conversion beam having the first partial beam and the second partial beam. In addition, the light combiner 110 may selectively filter out one of the first partial beam and the second partial beam by the diffusing and filtering component 111, and transmit the other one of the first partial beam and the second partial beam (i.e., the beam that has not been filtered out). Meanwhile, the input beam B-LD2 may pass through the diffusing and filtering component 111 to be combined with the beam that has not been filtered out to form the combined beam CLB.

Likewise, in the second time period, the image generator 120 is configured to receive the combined beam CLB and transmit the beam that has not been filtered out to one of the light valve DMDA and the light valve DMDB and transmit the input beam B-LD2 to the other one of the light valve DMDA and the light valve DMDB.

An example is provided below to describe details during the second time period. In an embodiment (the embodiment of a first operation mode), in the second time period, the light combiner 110 may filter out the second partial beam (e.g., a red beam) by the diffusing and filtering component 111 and combine the first partial beam (e.g., a green beam) with the input beam B-LD2 (e.g., a blue beam) to generate the combined beam CLB and transmit the combined beam CLB to the image generator 120. In the second time period, the image generator 120 transmits the first partial beam (a green beam) in the combined beam CLB to the light valve DMDA and transmits the input beam B-LD2 (a blue beam) in the combined beam CLB to the light valve DMDB for the light valves DMDA and DMDB to generate the image beam PIMG. In another embodiment (the embodiment of a second operation mode), in the second time period, the light combiner 110 may filter out the first partial beam (e.g., a green beam) by the diffusing and filtering component 111 and combine the second partial beam (e.g., a red beam) with the input beam B-LD2 (e.g., a blue beam) to generate the combined beam CLB and transmit the combined beam CLB to the image generator 120. In the second time period, the image generator 120 transmits the second partial beam (a red beam) in the combined beam CLB to the light valve DMDB and transmits the input beam B-LD2 (a blue beam) in the combined beam CLB to the light valve DMDA for the light valves DMDA and DMDB to generate the image beam PIMG.

In this embodiment, the wavelength of the input beam B-LD1 and that of the input beam B-LD2 are different. In this embodiment, the input beam B-LD2 may be a blue laser beam having a wavelength of about 460 nm, but the disclosure is not limited thereto. In other embodiments, the wavelength of the input beam B-LD2 may have other appropriate values according to requirements of design or product. In other embodiments, the input beam B-LD2 may be other excitation beams, such as a beam provided by a light-emitting diode, but the disclosure is not limited thereto.

Figure 2A:
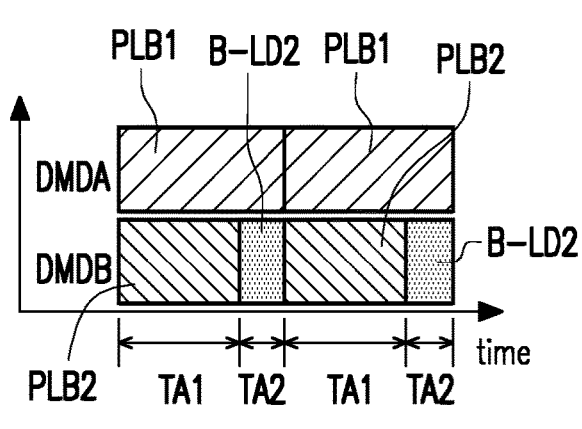
FIG. 2A and FIG. 2B are schematic diagrams respectively showing two operation modes according to an embodiment of the disclosure.
Figure 2B:
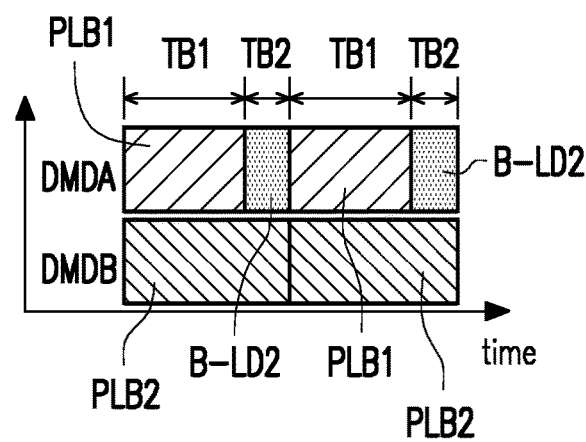

FIG. 2A and FIG. 2B are schematic diagrams respectively showing the two operation modes according to an embodiment of the disclosure. Referring to FIG. 1 and FIG. 2A, in FIG. 2A, in the first operation mode of this embodiment, the diffusing and filtering component 111 of the light combiner 110 may be configured to diffuse the received combined beam CLB in the first time period TA1 and perform a filtering operation on the second partial beam PLB2 (e.g., a red beam) and a transmission operation on the input beam B-LD2 (a blue beam) in the second time period TA2. Thus, in the first time period TA1, the image generator 120 may receive the combined beam CLB including the first partial beam PLB1 (e.g., a green beam) and the second partial beam PLB2 (a red beam) and transmit the first partial beam PLB1 (a green beam) and the second partial beam PLB2 (a red beam) to the light valve DMDA and the light valve DMDB respectively. In addition, in the second time period TA2, the image generator 120 may receive the combined beam CLB including the first partial beam PLB1 (a green beam) and the input beam B-LD2 (a blue beam) and transmit the first partial beam PLB1 (a green beam) and the input beam B-LD2 (a blue beam) to the light valve DMDA and the light valve DMDB respectively. It is known from the above that, in the first operation mode of this embodiment, neither of the light valve DMDA and the light valve DMDB is in an idle state, wherein in the first time period TA1 and the second time period TA2 (i.e., the entire period of one cycle), the light valve DMDA performs an image process on the first partial beam PLB1 (a green beam), in the first time period TA1 (i.e., a part of one cycle), the light valve DMDB performs the image process on the second partial beam PLB2 (a red beam), and in the second time period TA2 (i.e., a part of one cycle), the light valve DMDB performs the image process on the input beam B-LD2 (a blue beam). In this embodiment, since the light valve DMDA may perform the image process on the first partial beam PLB1 (a green beam) during the entire period of the cycle, the smoothness of green grayscale is effectively improved and the ratio of the green brightness to the overall brightness is also increased.

Referring to FIG. 1 and FIG. 2B, in FIG. 2B, in the second operation mode of this embodiment, the diffusing and filtering component 111 of the light combiner 110 may be configured to diffuse the received combined beam CLB in the first time period TB1 and perform a filtering operation on the first partial beam PLB1 (e.g., a green beam) and a transmission operation on the input beam B-LD2 (a blue beam) in the second time period TB2. Thus, in the first time period TB1, the image generator 120 may receive the combined beam CLB having the first partial beam PLB1 (e.g., a green beam) and the second partial beam PLB2 (a red beam) and transmit the first partial beam PLB1 (a green beam) and the second partial beam PLB2 (a red beam) to the light valve DMDA and the light valve DMDB respectively. In addition, in the second time period TB2, the image generator 120 may receive the combined beam CLB having the second partial beam PLB2 (a red beam) and the input beam B-LD2 (a blue beam) and transmit the second partial beam PLB2 (a red beam) and the input beam B-LD2 (a blue beam) to the light valve DMDB and the light valve DMDA respectively. It is known from the above that, in the second operation mode of this embodiment, neither of the light valve DMDA and the light valve DMDB is in the idle state, wherein in the first time period TB1 and the second time period TB2 (i.e., the entire period of one cycle), the light valve DMDB performs an image process on the second partial beam PLB2 (a red beam); in the first time period TB1 (i.e., a part of one cycle), the light valve DMDA performs the image process on the first partial beam PLB1 (a green beam); and in the second time period TB2 (i.e., a part of one cycle), the light valve DMDA performs the image process on the input beam B-LD2 (a blue beam). In this embodiment, since the light valve DMDB may perform the image process on the second partial beam PLB2 (a red beam) during the entire period of the cycle, the smoothness of red grayscale is effectively improved and the ratio of the red brightness to the overall brightness is also increased.

It should be noted that, in this embodiment, the first time periods TA1 and TB1 and the second time periods TA2 and TB2 respectively corresponding thereto take place consecutively and alternately. Thus, in the consecutive first time period TA1 (TB1) and second time period TA2 (TB2), color lights having multiple different wavelengths are efficiently transmitted to the light valve DMDA and the light valve DMDB, and neither of the light valve DMDA and the light valve DMDB is in the idle state, which effectively improves the efficiency of utilization of the light valve DMDA and/or the light valve DMDB, so as to improve the performance of the projector 100.

Moreover, in this embodiment, the light valve DMDA and the light valve DMDB may be digital micromirror devices (DMD), but the disclosure is not intended to limit the light valves to certain forms or types. In other embodiments, the light valve DMDA and the light valve DMDB may also be liquid-crystal displays (LCD) or liquid crystal on silicon panels (LCoS panel), or include an optical modulator, such as a transparent liquid crystal panel, an electro-optical modulator, a magneto-optic modulator, an acousto-optic modulator (AOM), and so on, but the disclosure is not limited thereto.

Figure 3:
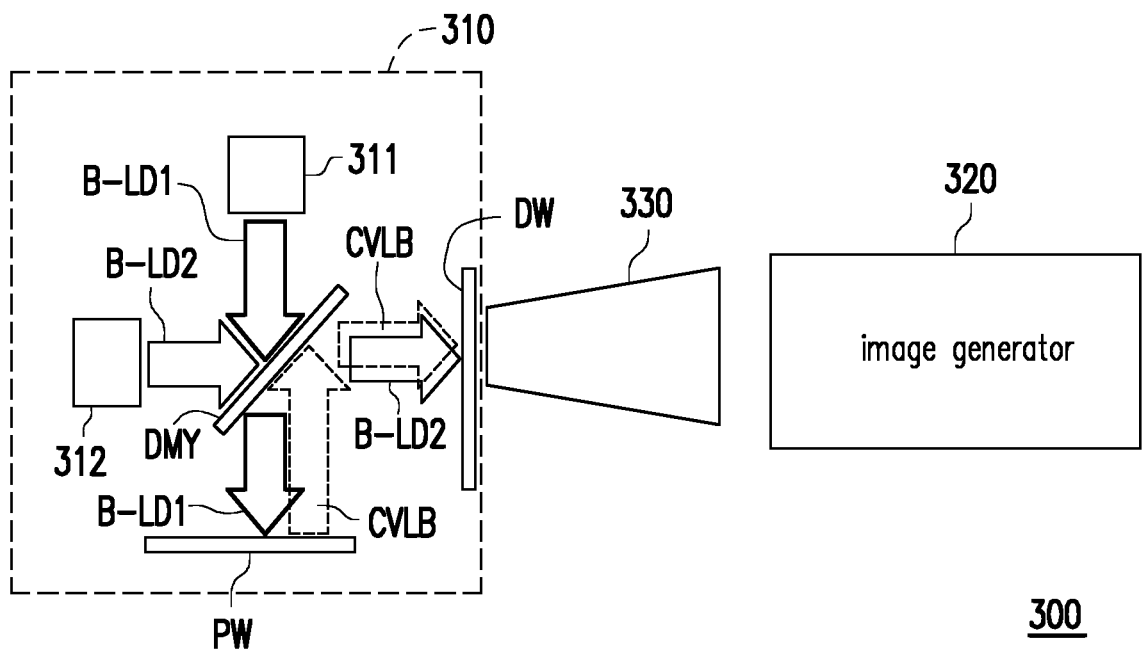
FIG. 3 is a schematic diagram showing a light path of the image generation device in a first time period and a second time period according to an embodiment of the disclosure.

Hereinafter, referring to FIG. 3, FIG. 3 is a schematic diagram showing a light path of the image generation device in the first time period and the second time period according to an embodiment of the disclosure. In this embodiment, the image generation device 300 includes a light combiner 310 and an image generator 320. The light combiner 310 includes a light splitting component DMY, a wavelength conversion component PW, and a diffusing and filtering component DW. The light splitting component DMY is disposed between the wavelength conversion component PW and the diffusing and filtering component DW, and the light splitting component DMY is disposed on a transmission path of an input beam B-LD1 and an input beam BLD2. In this embodiment, the input beam B-LD1 and the input beam BLD2 are respectively provided by a light source 311 and a light source 312. The light splitting component DMY is disposed between the light sources 311/312 and the wavelength conversion component PW, and the light splitting component DMY is disposed between the light sources 311/312 and the diffusing and filtering component DW. In this embodiment, the wavelength conversion component PW and the light source 311 are respectively disposed at two opposite sides of the light splitting component DMY, and the wavelength conversion component PW and the light source 312 are respectively disposed at two opposite sides of the light splitting component DMY. That is, the wavelength conversion component PW and the light sources 311/312 are located at different sides of the light splitting component DMY. Referring to FIG. 2A, FIG. 2B, and FIG. 3, in the first time periods TA1 and TB1, the light source 311 provides the input beam B-LD1, the light source 312 does not provide the input beam B-LD2, the light splitting component DMY allows the input beam B-LD1 to pass through, and the input beam B-LD1 passing through the light splitting component DMY is transmitted to the wavelength conversion component PW. The wavelength conversion component PW of the light combiner 310 converts the wavelength of the input beam B-LD1 to generate a conversion beam CVLB. That is, the wavelength conversion component PW is configured to convert the input beam B-LD1 into the conversion beam CVLB, wherein the conversion beam CVLB has a first partial beam and a second partial beam that have different wavelengths. The light splitting component DMY reflects the conversion beam CVLB from the wavelength conversion component PW to the diffusing and filtering component DW.

Referring to FIG. 2A, FIG. 2B, and FIG. 3, in the second time periods TA2 and TB2, the light source 311 provides the input beam B-LD1 and the light source 312 provides the input beam B-LD2, the light splitting component DMY allows the input beam B-LD1 to pass through, and the input beam B-LD1 passing through the light splitting component DMY is transmitted to the wavelength conversion component PW. The wavelength conversion component PW of the light combiner 310 converts the wavelength of the input beam B-LD1 to generate the conversion beam CVLB, wherein the conversion beam CVLB has a first partial beam and a second partial beam that have different wavelengths. The light splitting component DMY reflects the conversion beam CVLB from the wavelength conversion component PW to the diffusing and filtering component DW, and meanwhile allows the input beam B-LD2 to pass through. The input beam B-LD2 passing through the light splitting component DMY is transmitted to the diffusing and filtering component DW.

It is known from the above description that the diffusing and filtering component DW receives the conversion beam CVLB in the first time periods TA1 and TB1, and receives the conversion beam CVLB and the input beam B-LD2 simultaneously in the second time periods TA2 and TB2.

Figure 4:
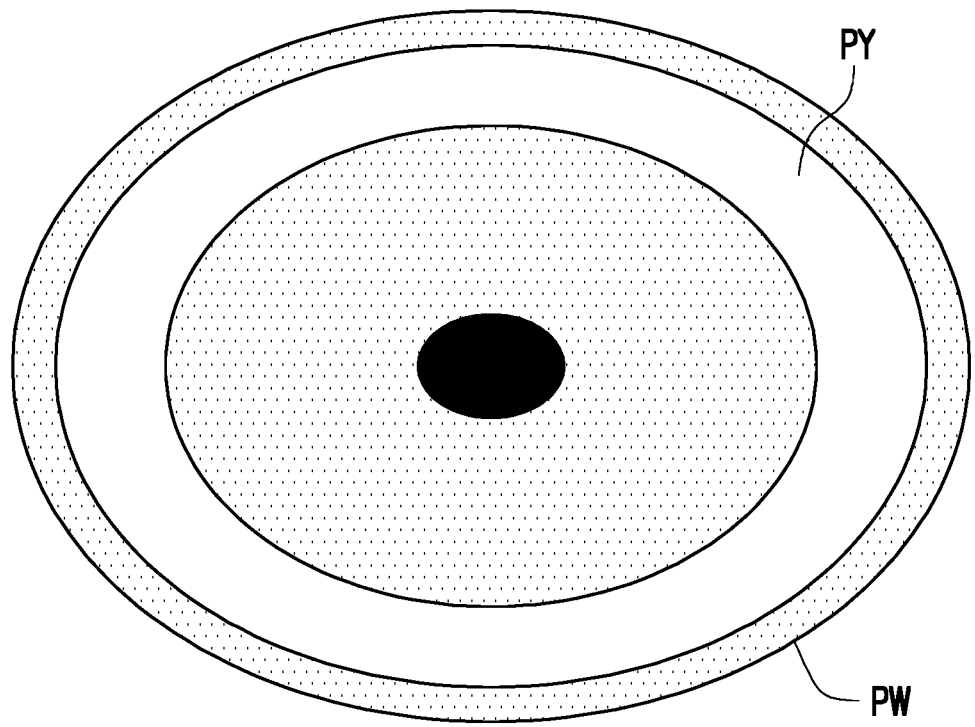
FIG. 4 is a schematic diagram of a wavelength conversion component according to an embodiment of the disclosure.

Referring to FIG. 4, FIG. 4 is a schematic diagram of the wavelength conversion component according to an embodiment of the disclosure. The wavelength conversion component PW may be a phosphor wheel. In this embodiment, a wavelength conversion material (e.g., phosphor) may be disposed in a region PY of the wavelength conversion component PW for converting the received blue input beam B-LD1 into a yellow conversion beam. In the wavelength conversion component PW of this embodiment, the same wavelength conversion material is disposed in the entire region PY, and the yellow conversion beam is generated based on the blue input beam B-LD1 during the entire period (the first time period and the second time period).

In this embodiment, the area of the region PY is not particularly limited, and the designer may decide the area of the region PY according to the cross-sectional area of the beam transferred through the light combiner.

Figure 5A:
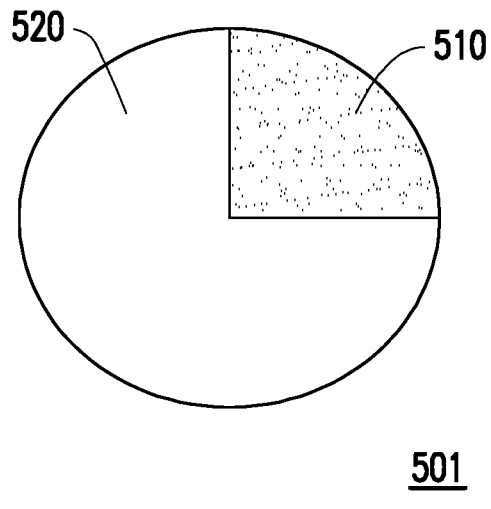
FIG. 5A and FIG. 5B are schematic diagrams respectively showing embodiments of a diffusing and filtering component in a first operation mode and a second operation mode of the disclosure.
Figure 5B:
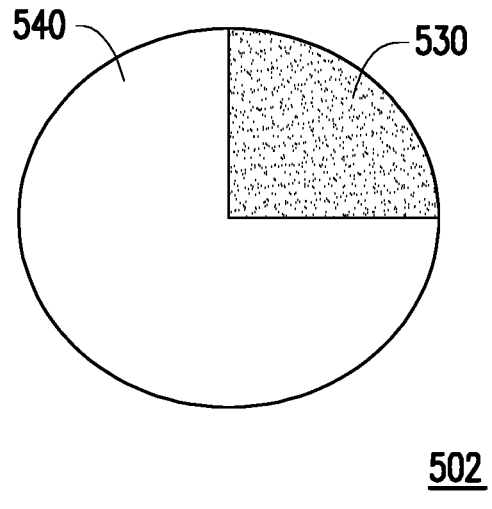

Hereinafter, referring to FIG. 5A and FIG. 5B, FIG. 5A and FIG. 5B are schematic diagrams respectively showing embodiments of the diffusing and filtering component in the first operation mode and the second operation mode of the disclosure. In FIG. 5A, a diffusing and filtering component 501 includes a diffusion region 520 and a filter region 510, wherein the diffusion region 520 and the filter region 510 respectively correspond to the first time period and the second time period in the first operation mode of this embodiment. That is, referring to FIG. 2A, FIG. 3, and FIG. 5A, in the first time period TA1, the diffusion region 520 of the diffusing and filtering component 501 receives the first partial beam and the second partial beam of the conversion beam CVLB, and diffuses and allows the first partial beam and the second partial beam of the conversion beam CVLB to pass through to be transmitted to the image generator 320. It is known from the above that, in the first time period TA1, in the first operation mode, the combined beam provided by the light combiner 310 is formed by the first partial beam and the second partial beam of the conversion beam CVLB.

Further to the above, in the second time period TA2, the filter region 510 of the diffusing and filtering component 501 receives the input beam B-LD2 and the first partial beam and the second partial beam of the conversion beam CVLB, and the filter region 510 filters out the second partial beam of the conversion beam CVLB and transmits the first partial beam of the conversion beam CVLB and the input beam B-LD2 to the image generator 320. It is known from the above that, in the second time period TA2 in the first operation mode, the combined beam provided by the light combiner 310 is formed by the input beam B-LD2 and the first partial beam of the conversion beam CVLB.

Furthermore, in FIG. 5B, a diffusing and filtering component 502 includes a diffusion region 540 and a filter region 530, wherein the diffusion region 540 and the filter region 530 respectively correspond to the first time period and the second time period in the second operation mode of this embodiment. That is, referring to FIG. 2B, FIG. 3, and FIG. 5B, in the first time period TB1, the diffusion region 540 of the diffusing and filtering component 502 receives the first partial beam and the second partial beam of the conversion beam CVLB, and diffuses and allows the first partial beam and the second partial beam of the conversion beam CVLB to pass through to be transmitted to the image generator 320. It is known from the above that, in the first time period TB1, in the second operation mode, the combined beam provided by the light combiner 310 is formed by the first partial beam and the second partial beam of the conversion beam CVLB.

Further to the above, in the second time period TB2, the filter region 530 of the diffusing and filtering component 502 receives the input beam B-LD2 and the first partial beam and the second partial beam of the conversion beam CVLB, and the filter region 530 filters out the first partial beam of the conversion beam CVLB and transmits the second partial beam of the conversion beam CVLB and the input beam B-LD2 to the image generator 320. It is known from the above that, in the second time period TB2 in the second operation mode, the combined beam provided by the light combiner 310 is formed by the input beam B-LD2 and the second partial beam of the conversion beam CVLB.

It is known from the above that the combined beam provided by the light combiner 310 may be formed by two of the input beam B-LD2, the first partial beam of the conversion beam CVLB, and the second partial beam of the conversion beam CVLB.

In the above embodiment, the diffusion regions 520 and 540 of the diffusing and filtering components 501 and 502 are light transmissive regions, for example. In the above embodiment, the filter regions 510 and 530 have a specific wavelength filter material, which is used to filter out one of the first partial beam and the second partial beam.

Referring to FIG. 3 again, in this embodiment, the image generation device 300 further includes a light homogenizing component 330. The light homogenizing component 330 is disposed between the image generator 320 and the light combiner 310. In this embodiment, the light homogenizing component 330 is a light integration ROD, for example, but the disclosure is not limited thereto. The light homogenizing component 330 may perform a light homogenizing operation on the conversion beam CVLB, or perform the light homogenizing operation on the input beam B-LD2 and the first partial beam/the second partial beam of the conversion beam VCLB. Simply put, the light homogenizing component 330 may perform the light homogenizing operation on the combined beam formed by two of the input beam B-LD2, the first partial beam of the conversion beam CVLB, and the second partial beam of the conversion beam CVLB, and transmit the homogenized combined beam to the image generator 320.

Figure 6:
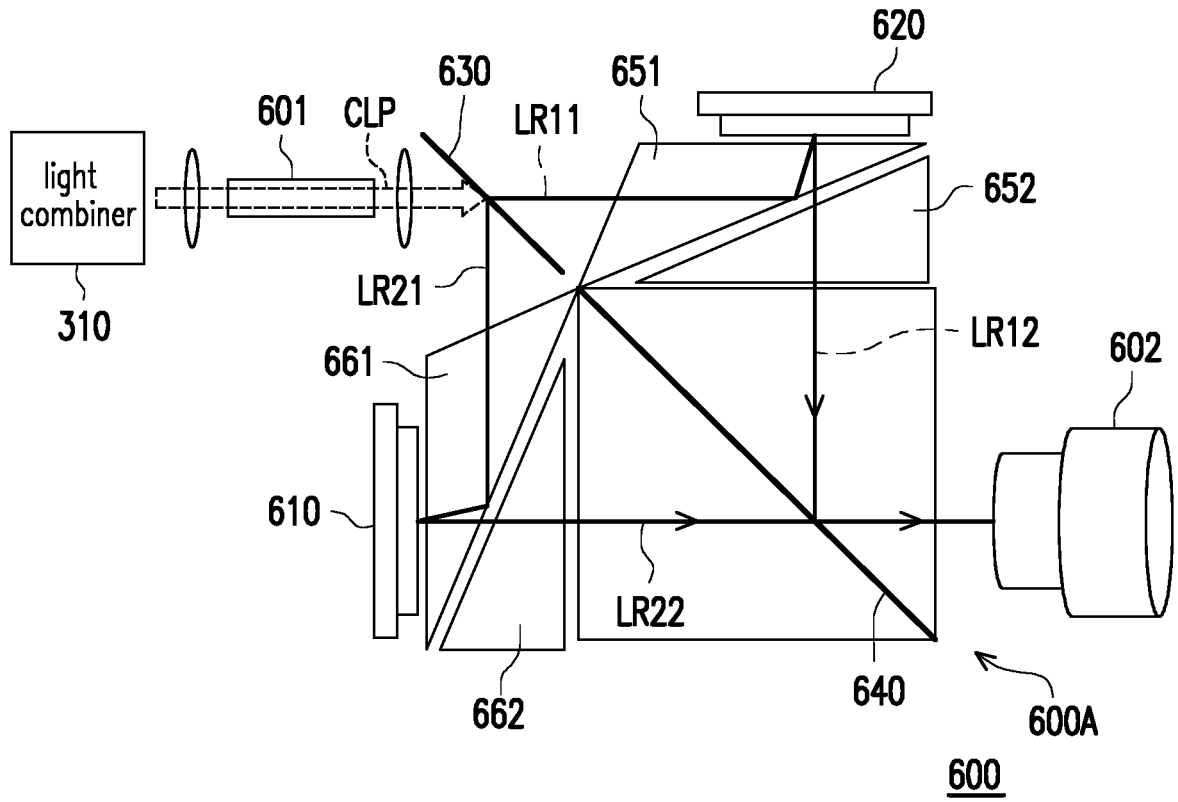
FIG. 6 is a schematic diagram of the projector according to an embodiment of the disclosure.

Referring to FIG. 6, FIG. 6 is a schematic diagram of a projector according to an embodiment of the disclosure. In this embodiment, the projector 600 includes a light combiner 310, a light homogenizing component 601, an image generator 600A, and a projection lens 602. In this embodiment, the image generator 600A includes light valves 610 and 620 and a light path adjustment component, wherein the light path adjustment component includes light splitting components 630 and 640 and prisms 651, 652, 661, and 662. The light splitting component 630 is disposed on a transmission path of a combined beam from the light combiner 310. In this embodiment, the light homogenizing component 601 is disposed between the light combiner 310 and the image generator 600A, and the light homogenizing component 601 is configured to homogenize the combined beam provided by the light combiner 310 to form a homogenized combined beam CLP to be transmitted to the light splitting component 630.

Details regarding embodiment of the projector 600 are described hereinafter. In the first time period, the combined beam CLP received by the light splitting component 630 includes a first partial beam (e.g., a green beam) and a second partial beam (e.g., a red beam). The light splitting component 630 may reflect the first partial beam, so as to transmit the first partial beam to the prism 661 along a light path LR21. Moreover, the light splitting component 630 may allow the second partial beam to pass through, so as to transmit the second partial beam to the prism 651 along a light path LR11. Then, the first partial beam (e.g., a green beam) and the second partial beam (e.g., a red beam) are respectively transmitted to the light valves 610 and 620 after the reflection of the prisms 661 and 651. The light valves 610 and 620 respectively generate image beams, such that the two image beams from the light valves 610 and 620 are respectively transmitted to the light splitting component 640 along the light paths LR22 and LR12. The light splitting component 640 then combines the image beams along the light paths LR22 and LR12 and transmits the combined image beam to the projection lens 602. Simply put, in the first time period, the light splitting component 630 is configured to transmit one of the first partial beam and the second partial beam to one of the light valve 610 and the light valve 620, and transmit the other one of the first partial beam and the second partial beam to the other one of the light valve 610 and the light valve 620.

In addition, in the second time period, the combined beam received by the light splitting component 630 may be a combination of the first partial beam (a green beam) and the input beam B-LD2 (a blue beam), or a combination of the second partial beam (a red beam) and the input beam B-LD2 (a blue beam). In the first operation mode, the light splitting component 630 receives the first partial beam (a green beam) and the input beam B-LD2 (a blue beam) to reflect the first partial beam (a green beam) to transmit the first partial beam (a green beam) to the light valve 610 and allow the input beam B-LD2 (a blue beam) to pass through to transmit the input beam B-LD2 (a blue beam) to the light valve 620. Moreover, in the second operation mode, the light splitting component 630 receives the second partial beam (a red beam) and the input beam B-LD2 (a blue beam) to allow the second partial beam (a red beam) to pass through to transmit the second partial beam (a red beam) to the light valve 620 and reflect the input beam B-LD2 (a blue beam) to transmit the input beam B-LD2 (a blue beam) to the light valve 610. Simply put, in the second time period, the light splitting component 630 is configured to transmit one of the first partial beam and the second partial beam to one of the light valve 610 and the light valve 620, and transmit the (second) input beam B-LD2 to the other one of the light valve 610 and the light valve 620.

Please refer to FIG. 7A and FIG. 7B for the optical characteristics of the light splitting component 630. FIG. 7A and FIG. 7B are diagrams respectively showing optical characteristic curves of the light splitting component 630 in the first operation mode and the second operation mode according to the embodiment of FIG. 6, wherein B, G, and R on the horizontal axis respectively represent a blue beam, a green beam, and a red beam. Referring to FIG. 6 and FIG. 7A, in the first operation mode, the light splitting component 630 has a high transmittance for the blue beam B (the input beam), a high reflectivity for the green beam G (the first partial beam), and a high transmittance for the red beam R (the second partial beam). Referring to FIG. 6 and FIG. 7B, in the second operation mode, the light splitting component 630 has a high reflectivity for the blue beam B (the input beam), a high reflectivity for the green beam G (the first partial beam), and a high transmittance for the red beam R (the second partial beam).

In the above embodiment, the light splitting component 630/640 may be formed by plating a film, for example, to achieve cost-down and high manufacturability, but the disclosure is not limited thereto.

Hereinafter, referring to FIG. 8, FIG. 8 is a schematic diagram of the light combiner according to another embodiment of the disclosure. The light combiner 800 includes light splitting components DMY and DMR, a wavelength conversion component PW, and a diffusing and filtering component DW, wherein the light splitting component DMR is disposed at the upstream of the diffusing and filtering component DW. The light splitting component DMY receives input beams B-LD1 and B-LD2 respectively generated by light sources 801 and 802 and is coordinated with the wavelength conversion component PW to transmit the first partial beam and the second partial beam of the conversion beam to the light splitting component DMR in first time period, or transmit the input beam B-LD2 and the first partial beam/the second partial beam of the conversion beam to the light splitting component DMR in the second time period. In addition, the light splitting component DMR further receives a (third) input beam R-LD generated by a light source 803 to compensate for one of the first partial beam and the second partial beam. In this embodiment, the wavelength of the input beam R-LD may be close to or identical with the wavelength of the second partial beam (the input beam R-LD and the second partial beam have similar or identical color light), which are both red beams, for example. That is, the second partial beam is a compensated partial beam, for example, but the disclosure is not limited thereto.

In the first time period in the first operation mode, the light source 803 may provide the input beam R-LD, and the light splitting component DMR may transmit the first partial beam, the second partial beam, and the input beam R-LD simultaneously to the diffusing and filtering component DW. In this embodiment, the first partial beam, the second partial beam, and the input beam R-LD pass through the diffusing and filtering component DW.

In the second time period in the first operation mode, the light source 803 stops providing the input beam R-LD. The light splitting component DMR may transmit the first partial beam, the second partial beam, and the input beam B-LD2 simultaneously to the diffusing and filtering component DW. In this embodiment, the diffusing and filtering component DW filters out the second partial beam and allows the input beam B-LD2 and the first partial beam to pass through.

In the first time period in the second operation mode, the light source 803 may provide the input beam R-LD, and the light splitting component DMR may transmit the first partial beam, the second partial beam, and the input beam R-LD simultaneously to the diffusing and filtering component DW. In this embodiment, the first partial beam, the second partial beam, and the input beam R-LD pass through the diffusing and filtering component DW.

In the second time period in the second operation mode, the light source 803 continues providing the input beam R-LD. The light splitting component DMR may transmit the first partial beam, the second partial beam, the input beam B-LD2, and the input beam R-LD simultaneously to the diffusing and filtering component DW. In this embodiment, the diffusing and filtering component DW filters out the first partial beam and allows the input beam R-LD, the input beam B-LD2, and the second partial beam to pass through.

A difference between this embodiment and the previous embodiment is that, in this embodiment, the light source 803 is additionally disposed to provide the input beam R-LD, which is a red beam. With the input beam R-LD, when the red beam is projected to the corresponding light valve (such as the light valve 620 in FIG. 6), the brightness and color purity of the red beam are compensated/enhanced, so as to improve the luminance and color gamut range, and promote the image display effect.

However, in other embodiments, the wavelength of the input beam R-LD may be close to or the same as the wavelength of the first partial beam (the input beam R-LD and the first partial beam have similar or identical color light), which are both green beams, for example. That is, the first partial beam is a compensated partial beam, for example. Thus, when the green beam is projected to the corresponding light valve (such as the light valve 610 in FIG. 6), the brightness and color purity of the green beam are compensated/enhanced, so as to improve the luminance and color gamut range, and promote the image display effect.

Figure 9:
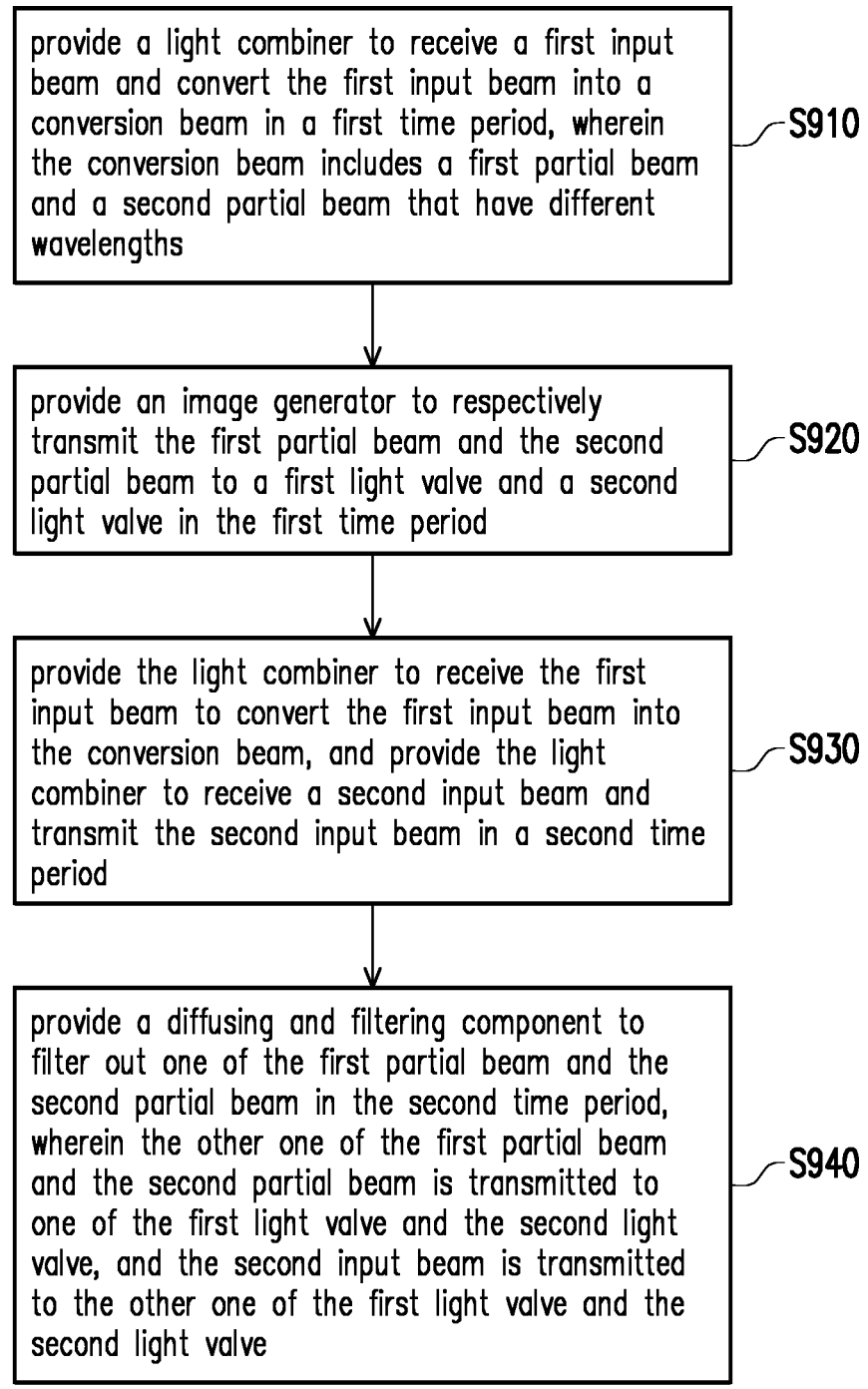
FIG. 9 is a flowchart of the image generation method according to an embodiment of the disclosure.

Hereinafter, referring to FIG. 9, FIG. 9 is a flowchart of an image generation method according to an embodiment of the disclosure. The image generation method includes: providing a light combiner to receive a first input beam and convert the first input beam into a conversion beam in a first time period, wherein the conversion beam includes a first partial beam and a second partial beam that have different wavelengths (Step S910); providing an image generator to respectively transmit the first partial beam and the second partial beam to a first light valve and a second light valve in the first time period (Step S920); providing the light combiner to receive the first input beam to convert the first input beam into the conversion beam, and providing the light combiner to receive a second input beam and transmit the second input beam in a second time period (Step S930); and providing a diffusing and filtering component to filter out one of the first partial beam and the second partial beam in the second time period, wherein the other one of the first partial beam and the second partial beam is transmitted to one of the first light valve and the second light valve, and the second input beam is transmitted to the other one of the first light valve and the second light valve (Step S940).

Details of the foregoing steps have been specified in the embodiments and implementation methods described above and thus are not repeated here.

To sum up, in the embodiments of the disclosure, beams of different wavelength combinations are provided to the image generator in different time periods, such that for various beam combinations with different wavelengths, the image generator may split various beams with different wavelengths and transmit the beams to the first light valve and the second light valve. Thus, the first light valve and the second light valve may then perform the image conversion operation and thus avoid an idle state, so as to effectively improve the performance of the projector and the image generation device. According to the embodiments of the disclosure, the brightness may be increased by 20%. According to the embodiments of the disclosure, the problem that a blue light spot seems somewhat purplish may be solved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
   an image generator comprising:
      a first light valve and a second light valve, configured to generate an image beam;
   a projection lens located on a transmission path of the image beam from the image generator; and
   a light combiner comprising a diffusing and filtering component, wherein the diffusing and filtering component is configured to generate a combined beam, and the image generator is configured to receive the combined beam from the diffusing and filtering component,
   wherein, in a first time period, the light combiner is configured to receive a first input beam and convert the first input beam into a conversion beam, wherein the conversion beam comprises a first partial beam and a second partial beam that have different wavelengths, and the first partial beam and the second partial beam are respectively transmitted to the first light valve and the second light valve,
   wherein, in a second time period, the light combiner is configured to receive the first input beam to convert the first input beam into the conversion beam, the light combiner is configured to receive a second input beam and transmit the second input beam, the diffusing and filtering component is configured to filter out one of the first partial beam and the second partial beam, and the other of the first partial beam and the second partial beam is transmitted to one of the first light valve and the second light valve, and the second input beam is transmitted to the other of the first light valve and the second light valve.

2. The projector according to claim 1, wherein the second input beam is not provided in the first time period.

3. The projector according to claim 1, wherein the light combiner further comprises a wavelength conversion component, and
   the wavelength conversion component is configured to convert the first input beam into the conversion beam.

4. The projector according to claim 1, wherein the light combiner further comprises a light splitting component, and
   the light splitting component is disposed between the wavelength conversion component and the diffusing and filtering component, and disposed on a transmission path of the first input beam and the second input beam, wherein the light splitting component allows the first input beam to pass through, so as to be transmitted to the wavelength conversion component, and reflects the conversion beam from the wavelength conversion component to the diffusing and filtering component,
   wherein in the second time period, the light splitting component further allows the second input beam to pass through to be transmitted to the diffusing and filtering component.

5. The projector according to claim 1, wherein the diffusing and filtering component comprises a diffusion region and a filter region, wherein the diffusion region and the filter region respectively correspond to the first time period and the second time period.

6. The projector according to claim 5, wherein the filter region has a specific wavelength filter material, and the specific wavelength filter material filters out one of the first partial beam and the second partial beam.

7. The projector according to claim 5, wherein the diffusion region of the diffusing and filtering component is a light transmissive region.

8. The projector according to claim 1, wherein the image generator further comprises a light path adjustment component, and
   the light path adjustment component comprises a light splitting component, wherein the light splitting component is disposed on a transmission path of the combined beam from the light combiner,
   wherein, in the first time period, the light splitting component is configured to transmit one of the first partial beam and the second partial beam to one of the first light valve and the second light valve and to transmit the other of the first partial beam and the second partial beam to the other of the first light valve and the second light valve, wherein, in the second time period, the light splitting component is configured to transmit one of the first partial beam and the second partial beam to one of the first light valve and the second light valve and to transmit the second input beam to the other of the first light valve and the second light valve.

9. The projector according to claim 1, wherein a wavelength of the first input beam and a wavelength of the second input beam are different.

10. The projector according to claim 1, wherein the first input beam and the second input beam are blue laser beams.

11. The projector according to claim 1, wherein the light combiner further comprises a light splitting component, and the light splitting component is disposed at the upstream of the diffusing and filtering component, receives a third input beam, and combines a compensated partial beam of the first partial beam and the second partial beam with the third input beam, wherein the compensated partial beam and the third input beam are together transmitted to one of the first light valve and the second light valve.

12. The projector according to claim 11, wherein the third input beam and the compensated partial beam comprise an identical color light.

13. The projector according to claim 1, wherein the projector further comprises a light homogenizing component, and the light homogenizing component is disposed between the image generator and the light combiner and is configured to perform a light homogenizing operation on a combined beam formed by two of the first partial beam, the second partial beam, and the second input beam, and to transmit the homogenized combined beam to the image generator.

14. An image generation device, comprising:

an image generator comprising a first light valve and a second light valve; and a light combiner comprising a diffusing and filtering component, wherein, in a first time period, the light combiner is configured to receive a first input beam and convert the first input beam into a conversion beam, wherein the conversion beam comprises a first partial beam and a second partial beam that have different wavelengths, and the first partial beam and the second partial beam are respectively transmitted to the first light valve and the second light valve, wherein, in a second time period, the light combiner is configured to receive the first input beam to convert the first input beam into the conversion beam, the light combiner is configured to receive a second input beam and transmit the second input beam, the diffusing and filtering component is configured to filter out one of the first partial beam and the second partial beam, and the other of the first partial beam and the second partial beam is transmitted to one of the first light valve and the second light valve, and the second input beam is transmitted to the other of the first light valve and the second light valve.

15. An image generation method, comprising:

in a first time period, providing a light combiner to receive a first input beam and convert the first input beam into a conversion beam, wherein the conversion beam comprises a first partial beam and a second partial beam that have different wavelengths;

in the first time period, providing an image generator to transmit the first partial beam and the second partial beam to a first light valve and a second light valve respectively;

in a second time period, providing the light combiner to receive the first input beam to convert the first input beam into the conversion beam, and providing the light combiner to receive a second input beam and transmit the second input beam; and in the second time period, providing a diffusing and filtering component to filter out one of the first partial beam and the second partial beam, wherein the other of the first partial beam and the second partial beam is transmitted to one of the first light valve and the second light valve, and the second input beam is transmitted to the other of the first light valve and the second light valve.

16. The image generation method according to claim 15, wherein the second input beam is not provided in the first time period.

17. The image generation method according to claim 15, further comprising:

providing a light splitting component to allow the first input beam to pass through to be transmitted to the wavelength conversion component to generate the conversion beam, and reflect the conversion beam from the wavelength conversion component to the diffusing and filtering component.

18. The image generation method according to claim 17, wherein in the second time period, the step of providing the light combiner to receive the second input beam and transmit the second input beam comprises:

in the second time period, allowing the second input beam to pass through the light splitting component to be transmitted to the diffusing and filtering component.

19. The image generation method according to claim 15, wherein in the first time period, the step of providing the image generator to transmit the first partial beam and the second partial beam to the first light valve and the second light valve respectively comprises:

providing a light splitting component in the image generator, such that in the first time period, the light splitting component transmits one of the first partial beam and the second partial beam to one of the first light valve and the second light valve and transmits the other of the first partial beam and the second partial beam to the other of the first light valve and the second light valve.

20. The image generation method according to claim 15, wherein in the second time period, the step of providing the diffusing and filtering component to filter out one of the first partial beam and the second partial beam such that the other of the first partial beam and the second partial beam is transmitted to one of the first light valve and the second light valve and transmitting the second input beam to the other of the first light valve and the second light valve comprises:

providing a light splitting component in the image generator, such that in the second time period, the light splitting component transmits one of the first partial beam and the second partial beam to one of the first light valve and the second light valve and transmits the second input beam to the other of the first light valve and the second light valve.

21. The image generation method according to claim 15, further comprising:

providing a light splitting component to receive a third input beam, and combining a compensated partial beam of the first partial beam and the second partial beam with the third input beam, wherein the compensated partial beam and the third input beam are together transmitted to one of the first light valve and the second light valve.

22. The image generation method according to claim 21, wherein the third input beam and the compensated partial beam comprise an identical color light.

23. The image generation method according to claim 15, further comprising:

providing a light homogenizing component to perform a light homogenizing operation on a combined beam formed by two of the first partial beam, the second partial beam, and the second input beam; and transmitting the homogenized combined beam to the image generator.

* * * * *